Dec. 12, 1950   E. C. HARTLEY   2,533,931
VALVE ASSEMBLY
Filed Dec. 5, 1944   2 Sheets-Sheet 1
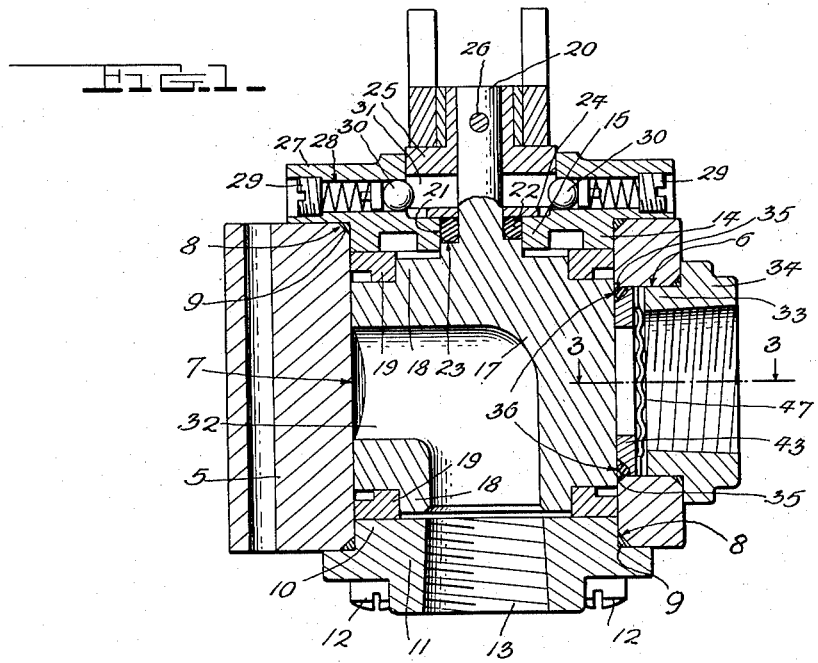
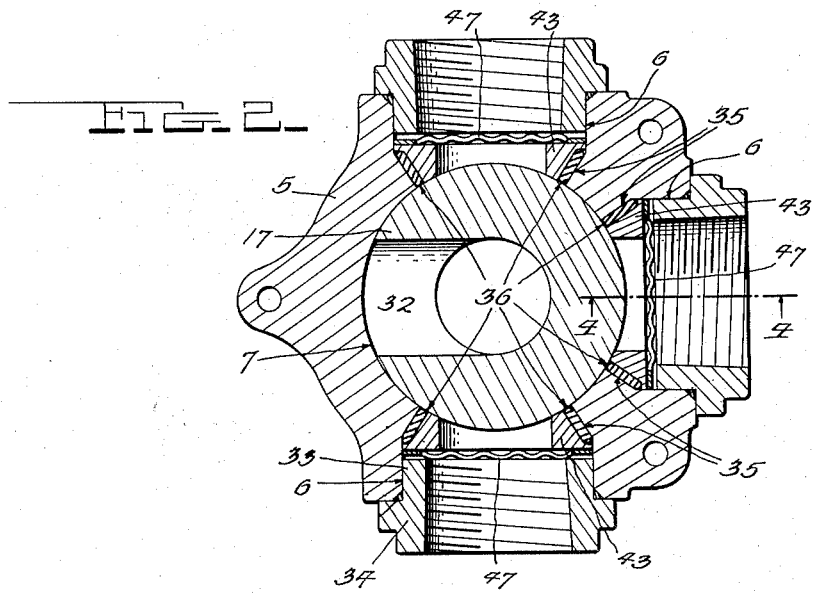
Inventor
Emmett C. Hartley.
By Mason, Porter & Diller
Attorneys

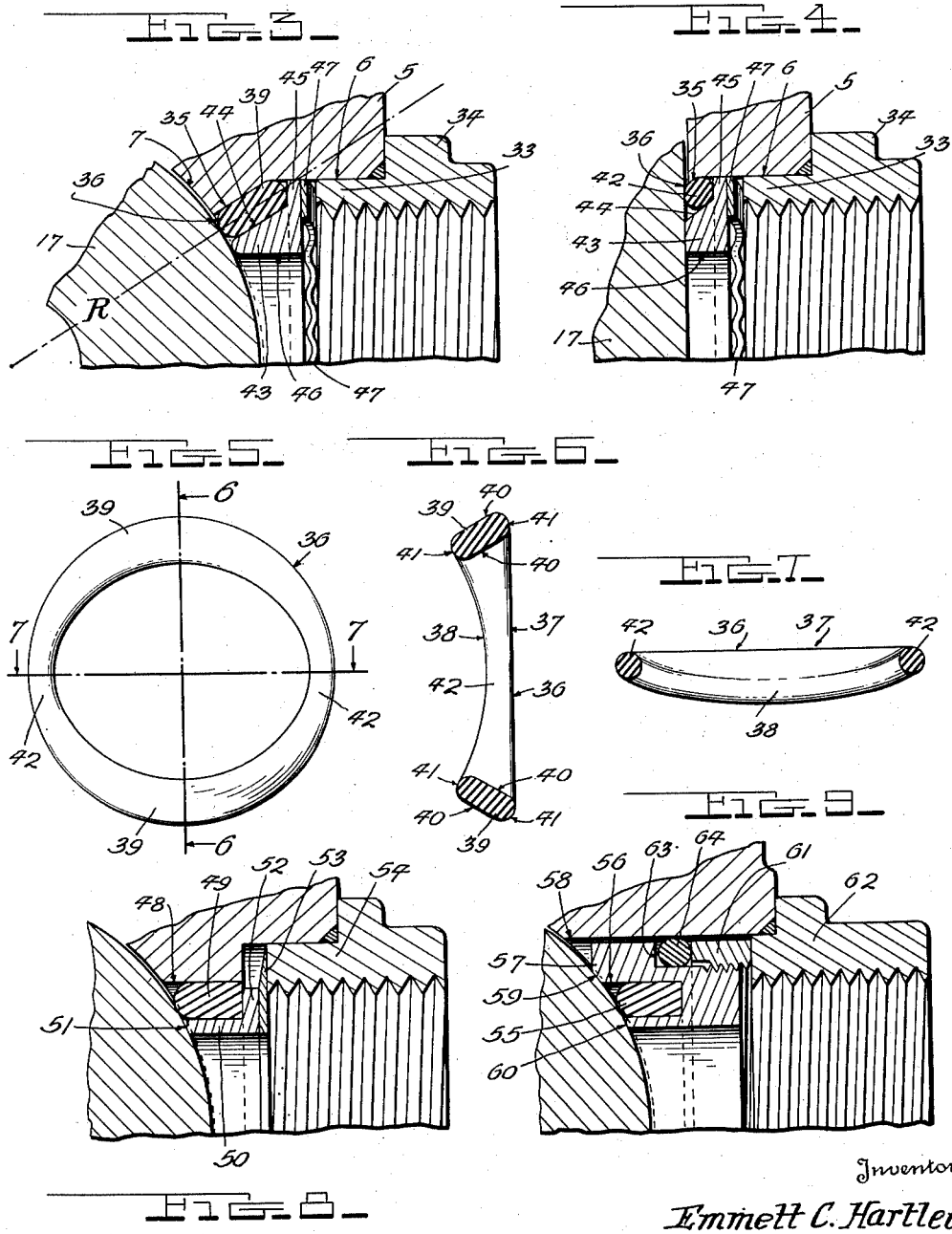

Patented Dec. 12, 1950

2,533,931

UNITED STATES PATENT OFFICE 2,533,931

VALVE ASSEMBLY

Emmett C. Hartley, Cleveland, Ohio, assignor to The Parker Appliance Company, Cleveland, Ohio, a corporation of Ohio Application December 5, 1944, Serial No. 566,703

5 Claims. (Cl. 251—113)

The invention relates generally to valves and primarily seeks to provide a valve structure embodying a casing having at least one inlet port and at least one outlet port, a rotor having a flow passage therethrough and turnable for permitting or preventing flow of fluid through said ports and passage, and a novel sealing ring structure and mounting means therefor carried by the casing with the ring yieldably engaging the rotor for sealing off the ring surrounded port when the rotor is turned so as to place the flow passage therein out of registry with said ring surrounded port, said ring and said mounting means being so constructed and cooperatively arranged as to provide for the desired port sealing function without danger of the ring being pinched between the rotor and the casing as the flow passage in the rotor is moved past the ring.

In valve structures of the character stated in which port sealing rings have been mounted in grooves formed in the casing it is sometimes found that the groove mounted rings tend to project from the grooves and become pinched between the cooperating rotor and casing parts as the flow passage in the rotor is moved past said rings. This is caused in part by frictional contact between the rotor and the sealing ring and resulting pressure of the ring against wall portions defining the mounting groove and bearing such angular relation to the direction of force application as to tend to crowd the ring out of the mounting groove and into the passing rotor flow passage. Obviously this pinching of rings is objectionable. It is a purpose of the present invention to provide a novel form of sealing ring and a novel mounting therefor effective to prevent this objectionable pinching and yet provide for a highly efficient sealing of the port or ports.

An object of the invention is to provide a novel form of sealing ring of the character stated formed of deformable resilient material such as rubber or its equivalent and molded to shape so that one face thereof will conform to and seal against the adjacent generally cylindrical peripheral portion of the rotor and the opposite face will lie in a plane perpendicular to the axis of the port sealed by the ring, thus to present a large mass of rubber at each side of the ring in the plane of rotation of the rotor, or in other words at portions of the ring most likely to be pinched between the rotor and casing, and by this means minimize the likelihood of such pinching.

Another object of the invention is to provide a sealing ring structure of the character stated and a novel mounting therefor including means for yieldably pressing the ring against the rotor.

Still another object of the invention is to provide a novel mounting for a sealing ring of the character stated in which the ring is supported about the whole circle of its outer edge portion in a coniform inner end extension of the port bore to be sealed by the ring and is held against said coniform wall by a ring having a coniform sealing ring engaging face bearing parallel spaced relation to opposing wall portions of the coniform casing bore extension at points about the circle of the sealing ring and to a radial struck from the rotor center between said opposing wall portions at said points. Stated another way, the sealing ring is so formed and mounted that it constitutes a portion of a cone the apex of which is coincident with the center of the rotor cross section at the plane in which the port bore axis lies.

Still another object of the invention is to provide a sealing ring structure of the character stated which is mounted in a groove formed in a carrier ring which is in turn removably mounted in a casing port bore and composed of two sections threadably connected in a manner permitting adjustment of the length of the carrier ring and providing an annular groove in which is carried a sealing ring engageable in sealing contact with said port bore.

With the above and other objects in view that will hereinafter appear, the nature of the invention will be more clearly understood by reference to the following detailed description, the appended claims, and the several views illustrated in the accompanying drawings.

In the drawings:

Figure 1 is a central vertical cross sectional view illustrating a valve assembly embodying the invention.

Figure 2 is a horizontal section taken through the axes of the equidistantly spaced valve ports.

Figure 3 is an enlarged fragmentary sectional view taken on the line 3—3 on Figure 1.

Figure 4 is an enlarged fragmentary sectional view taken on the line 4—4 on Figure 2.

Figure 5 is a face view of one of the sealing rings.

Figure 6 is a detail cross section taken on the line 6—6 on Figure 5.

Figure 7 is a detail horizontal section taken on line 7—7 on Figure 5.

Figure 8 is an enlarged fragmentary sectional view similar to Figure 4 and illustrating a slightly modified form of the invention.

Figure 9 is an enlarged fragmentary sectional view similar to Figure 4 and illustrating another slightly modified form of the invention.

In the disclosure herein presented exemplifying the invention, the novel features are shown as incorporated in a valve in which the casing has three inlet or delivery ports arranged in a common horizontal plane and a single downwardly directed inlet or outlet port, and the rotor has an elbow flow passage turnable into registry with a selected one of the group of three ports for bringing about flow communication between the selected one of the three ports and the downwardly directed port, or the rotor can be turned to close off communication with all three of the horizontally disposed ports. It is to be understood that the invention can be applied as well to various other forms of valve structures.

In the form of the invention herein disclosed, the valve structure includes a casing 5 having three radially disposed bores 6 all arranged in a common horizontal plane. Each of the bores 6 open into a large cylindriform rotor bore 7, and each end of the rotor bore is chamfered as at 8 to provide a seat for a sealing ring 9. The sealing ring at the bottom of the valve surrounds a boss 10 extending from a closure cap 11 which is screw secured as at 12 to said casing and which holds the ring in tight sealing contact with its seat. The cap 11 is equipped with a central inlet or discharge port 13.

The sealing ring or gasket 9 at the top of the valve surrounds a boss 14 extending from a closure cap 15 which is screw secured to the casing, and the boss 14, like the previously mentioned cap boss 10, extends into the respective end of the rotor bore 7.

A valve rotor 17 is freely rotatably mounted in the rotor bore 7 and is equipped with bearing hubs 18 at the respective ends thereof which are rotatably received in non-metallic bearing rings 19 mounted in the casing in a manner clearly illustrated in Figure 2. The rotor includes a reduced diameter stem extension 20 which passes through a center bore 21 in the cap 15 wherein it is surrounded by a packing ring 22 disposed between the stem shoulder 23 and an abutment ring 24 surrounding the same in spaced relation to said shoulder.

The cap 15 also has a counterbore within which is received the collar 25 which is pin secured as at 26 upon the end of the rotor stem which extends out of the casing. The cap 15 also is equipped with a raised rib 27 having a longitudinal bore 28 therethrough in each end of which is threadably mounted an abutment screw 29 and a spring pressed ball or detent 30. Each ball or detent 30 is engageable in a recess 31 formed in the external surface of the collar 25, four such recesses being provided in equidistantly spaced relation. The spring pressed elements 30 serve to yieldably hold the rotor in selected positions or stations each disposed in 90° spaced relation about the rotor center.

The rotor 17 is provided with an elbow flow passage 32 which constantly communicates with the casing bottom port 13 at one end and has its other end presented for selective communication with the several casing port bores 6. The yieldable detent and recess equipments 30, 31 will yieldably retain the rotor in the off position in which its flow passage 32 will be out of communication with all of the casing ports as in Figures 1 and 2, or it will be yieldably held in position for registering with any selected one of the casing ports.

Into the outer end of each casing bore 6 is fitted the positioning boss 33 of a port adaptor 34 which is screw secured to the casing.

At its inner end each port bore 6 includes a coniform extension 35 which opens into the rotor bore 7. Mounted in the coniform extension 35 of each port bore 6 is a sealing ring generally designated 36 such as is disclosed in detail in Figures 5, 6 and 7 of the drawings. Each said ring is formed of rubber or an equivalent deformable resilient material and is molded to the shape illustrated in said figures. Each ring includes an outer face 37 adapted to be disposed perpendicularly with respect to the axis of the port bore in which it is mounted, and an inner face 38 which conforms to the peripheral curvature of the rotor. The peculiar shaping of the sealing rings illustrated in Figures 5, 6 and 7 provides portions 38 of relatively large mass at each side of the ring in the plane of rotation of the rotor, or in other words at the portions of the ring most likely to be pinched between the rotor and the casing, and by this means the likelihood of pinching of the sealing rings is minimized. Each said large mass portion 39 of the ring includes parallel wall portions 40 and rounded ends 41, and these relatively large mass portions of the ring merge into ring portions 42 which are approximately round in cross section at the intermediate quarters of the ring. It will be apparent by reference to Figures 2 and 3 of the drawings that the parallel face portions 40 of each ring when properly mounted are centered at opposite sides of a radial R struck from the rotor center. In other words, each sealing ring is so formed and mounted that it constitutes a portion of a cone the apex of which is co-incident with the center of the rotor cross section at the plane in which the port bore axis lies.

Each sealing ring 36 is held in place by a follower ring 43 having a coniform sealing ring engaging surface 44, an outwardly extended backing flange 45 and an inner, bore defining surface 46. A wavy washer 47 is interposed between the outer end of each follower ring 43 and the adjacent face of the port adaptor boss 33, and the washer serves to constantly and yieldably press the respective follower ring 43 and sealing ring 36 against the peripheral surface of the rotor 17.

In the form of the invention illustrated in Figures 1 through 7 the coniform port bore extensions 35 serve to retain the sealing rings and minimize the possibility of the rings becoming wedged and pinched between the rotor and the casing when the rotor is turned in the counterclockwise direction as viewed in Figure 3, and the coniform surface on the follower rings 43 and the engagement of said rings with the rotor serve to retain the sealing rings 36 and prevent pinching thereof between the rotor 17 and said follower rings when the rotor is turned in the clockwise direction as viewed in Figure 3. The molding of the ring to the exact shape illustrated in said figures assures that an efficient seal will be provided by the rings with a minimum of distortion of the ring shape in the provision of said seal. Uniform dimensional distortion about the full circle of each sealing ring lessens the pressure of contact where the relatively large rubber mass 39 is provided several times the pressure contact at the smallest cross section indicated at 42. It will be obvious that it is much easier to deform relatively large mass portions of the sealing rings, and thus with a lower pressure contact and a large mass of the deformable sealing material disposed in the plane of rotation of the rotor where pinching of the sealing ring between the rotor and the casing or the follower ring is most likely to take place, the likelihood of such pinching is reduced to a minimum. It will be obvious also that each sealing ring generally designated 36 serves the dual function of effecting a seal against the peripheral surface of the rotor 17 and also between the follower ring 43 and the casing.

In the modified form of the invention illustrated in Figure 8 the sealing ring is mounted in a cylindrical bore 48. The sealing ring structure is broadly the same as is disclosed in Figures 5, 6 and 7 with respect to the provision of large masses of rubber in the plane of rotation of the rotor, but in this form of the ring, the ring, generally designated 49, lies flat against the outer wall of the bore 48 and against the outer face of a sleeve 50, the inner end of which is shaped to conform to and engage the peripheral surface of the rotor as at 51. The ring or sleeve 51 includes an outwardly turned follower flange 52 which engages the outer face of the ring 49 and which is in turn engaged by a yieldable washer 53 which extends into a counterbore formed in the casing and which is adapted to receive the boss 54 of the respective port adaptor. The washer 53 yieldably urges the inner face of the sealing ring 49 and the inner edge portion 51 of the mounting ring 50 into sealing contact with the periphery of the rotor.

In Figure 9 of the drawings there is illustrated still another modified form of the invention in which the sealing ring generally designated 55 is constructed in the same manner as in Figure 8 and is mounted in an annular groove 56 formed in the inner face of a carrier ring 57. The carrier ring 57 is mounted in a cylindrical port bore 58 formed in the casing and engages the periphery of the rotor as at 59 and 60 at opposite sides of the annular groove in which the sealing ring 55 is mounted. The carrier ring 57 includes a threadably mounted section or ring portion 61 which abuts the boss 62 of the respective port adaptor. The provision of the relatively adjustable ring sections 57 and 61 makes it possible to vary the length of the carrier ring as a whole, and by reason of the spacing of the ring portions in the manner illustrated in Figure 9, there is provided an annular groove 63 in which a sealing ring 64 is mounted in position for engaging in sealing contact between the base of the groove and the port bore 58. By adjustment of the length of the carrier ring, the desired pressure of the carrier ring and sealing ring against the rotor can be maintained.

It will be noted that in all three forms of the invention herein disclosed the feature of providing a relatively large mass of rubber or yieldable sealing material at each side of the ring in the plane of rotation of the rotor is embodied.

While several examples of embodiment of the invention are disclosed herein, it is to be understood that other variations in the novel structures herein disclosed may be made without departing from the spirit and scope of the invention as defined in the appended claims.

I claim:

1. In a valve assembly, a casing having a rotor bore and at least one port bore leading thereinto, a rotor rotatably mounted in the rotor bore and having a flow passage therein and turnable for permitting or preventing flow of fluid through said port bore and passage, said port bore having a cylindrical outer portion and a coniform inner end extension opening into the rotor bore, a sealing ring of rubber or equivalent yieldable and resilient material formed to present an outer face perpendicular to the axis of the port bore and an inner face curved to conform to and engage in sealing contact with the periphery of the rotor and with said coniform bore extension thereby to present a relatively large mass of the yieldable ring material at each side of the ring centered in the plane intersecting the axis of said port in the direction of rotation of the rotor and a relatively small mass of said material at the other two sides of said ring, said sealing ring inner face also being curved away from the rotor periphery in both directions from an annular contact line so as to normally engage the rotor periphery at said contact line only and be free to move slightly with the rotor in either direction of rotation, and a port defining sealing ring backing ring engaging and holding the sealing ring in the port bore and shaped to form at least part of an annular groove for receiving said ring and to present an annulus within said sealing ring in position for constantly contacting the peripheral surface of the rotor and limiting the extent to which the sealing ring is deformed against the rotor periphery.

2. In a valve assembly, a casing having a rotor bore and at least one port bore leading thereinto, a rotor rotatably mounted in the rotor bore and having a flow passage therein and turnable for permitting or preventing flow of fluid through said port bore and passage, said port bore having a cylindrical outer portion and a coniform inner end extension opening into the rotor bore, a sealing ring of rubber or equivalent yieldable and resilient material formed to present an outer face perpendicular to the axis of the port bore and an inner face curved to conform to and engage in sealing contact with the periphery of the rotor and with said coniform bore extension thereby to present a relatively large mass of the yieldable ring material at each side of the ring centered in the plane intersecting the axis of said port in the direction of rotation of the rotor and a relatively small mass of said material at the other two sides of said ring, said sealing ring inner face also being curved away from the rotor periphery in both directions from an annular contact line so as to normally engage the rotor perpihery at said contact line only and be free to move slightly with the rotor in either direction of rotation, and a port defining sealing ring backing ring engaging and holding the sealing ring in the port bore and shaped to form at least part of an annular groove for receiving said ring and to present an annulus within said sealing ring in position for constantly contacting the peripheral surface of the rotor and limiting the extent to which the sealing ring is deformed against the rotor periphery and means constantly urging the backing ring and the sealing ring against the rotor.

3. A valve assembly as defined in claim 1 in which the backing ring includes a coniform sealing ring engaging face bearing parallel spaced relation to opposing wall portions of the coniform casing bore extension at points about the circle of the sealing ring and to a radial struck from the rotor center between said opposing wall portions at said points.

4. A valve assembly as defined in claim 1 in which the sealing ring is so formed and mounted that it constitutes a ring section of a cone the apex of which is coincident with the center of the rotor cross section at the plane in which the port bore axis lies.

5. In a valve assembly, a casing having a rotor bore and at least one port bore leading thereinto, a rotor rotatably mounted in the rotor bore and having a flow passage therein and turnable for permitting or preventing flow of fluid through said port bore and passage, said port bore having a cylindrical outer portion and a coniform inner end extension opening into the rotor bore, a sealing ring of rubber or equivalent yieldable and resilient material formed to present an outer face perpendicular to the axis of the port bore and an inner face curved to conform to and engage in sealing contact with the periphery of the rotor and with said coniform bore extension thereby to present a relatively large mass of the yieldable ring material at each side of the ring centered in the plane intersecting the axis of said port in the direction of rotation of the rotor and a relatively small mass of said material at the other two sides of said ring, said sealing ring inner face also being curved away from the rotor periphery in both directions from an annular contact line so as to normally engage the rotor periphery at said contact line only and be free to move slightly with the rotor in either direction of rotation, a port defining sealing ring backing ring engaging and holding the sealing ring in the port bore and shaped to form at least part of an annular groove for receiving said ring and including a coniform sealing ring engaging face bearing parallel spaced relation to opposing wall portions of the coniform casing bore extension at points about the circle of the sealing ring and to a radial struck from the rotor center between said opposing wall portion at said points, and means constantly urging the backing ring and the sealing ring toward the rotor.

EMMETT C. HARTLEY.

REFERENCES CITED

The following references are of record in the file of this patent:

UNITED STATES PATENTS

| Number | Name | Date |
|---|---|---|
| 743,511 | Huxley | Nov. 10, 1903 |
| 934,614 | Huxley | Sept. 21, 1909 |
| 2,297,161 | Newton | Sept. 29, 1942 |
| 2,357,232 | Snyder | Aug. 29, 1944 |

FOREIGN PATENTS

| Number | Country | Date |
|---|---|---|
| 349,531 | Italy | June 16, 1937 |
| 520,188 | Germany | Mar. 9, 1931 |